July 15, 1958  A. G. EICKMEYER ET AL  2,842,941
METHOD FOR PURIFICATION OF CARBON DIOXIDE
Filed March 29, 1956
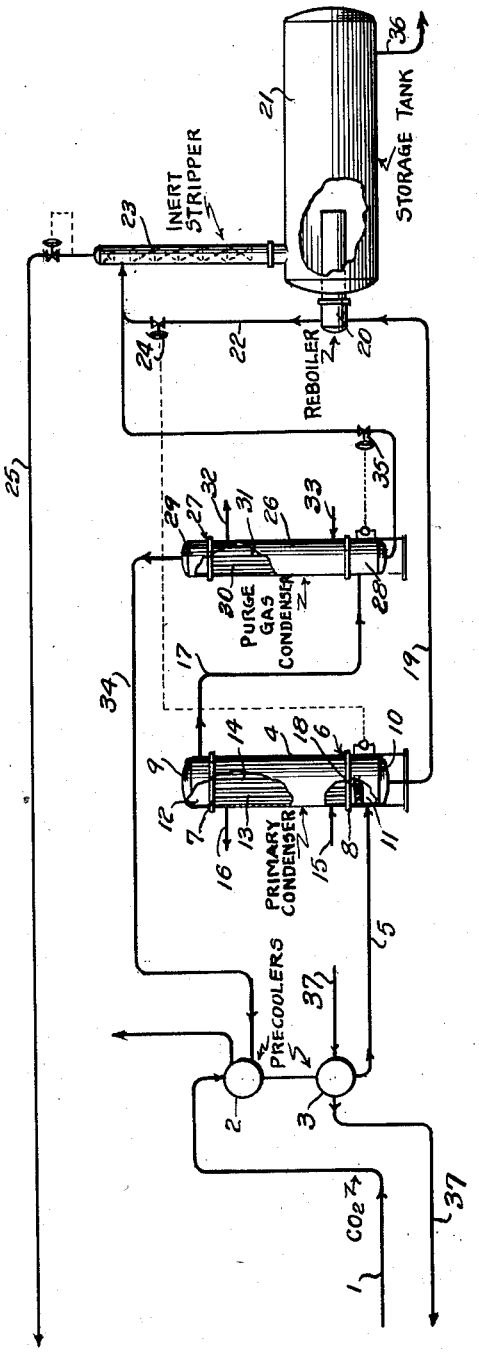
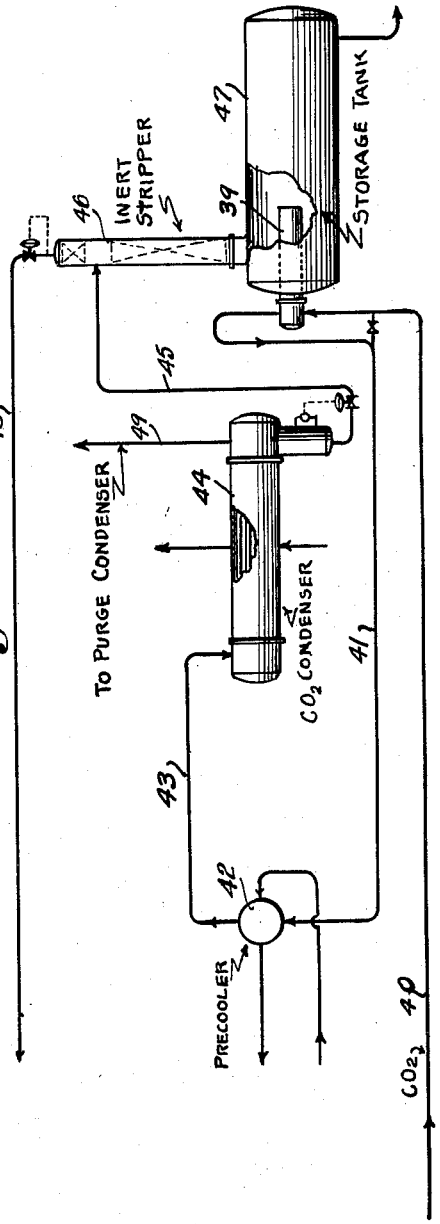
INVENTORS.
Allen G. Eickmeyer +
Walter W. Deschner
BY Paul E. Mullendore
ATTORNEY

2,842,941

METHOD FOR PURIFICATION OF CARBON DIOXIDE

Allen G. Eickmeyer, Prairie Village, and Walter W. Deschner, Leawood, Kans., assignors to J. F. Pritchard & Company, Kansas City, Mo., a corporation of Missouri Application March 29, 1956, Serial No. 574,656

6 Claims. (Cl. 62—24)

This invention relates to a method for purification of carbon dioxide gas. When carbon dioxide is obtained from a mixture of gases in accordance with customary methods, especially with water scrubbing, quantities of the inert gas remain in mixture therewith and become dissolved when the carbon dioxide is liquefied. This is undesirable, because the liquid carbon dioxide may be required for medical and beverage use. Also when the liquid is used to manufacture Dry Ice, the dissolved inert gases cause brittleness of the Dry Ice.

It is, therefore, the principal object of the present invention to provide a method for removing the inert gases that remain in the carbon dioxide gas and which usually become dissolved when the carbon dioxide is liquefied.

A further object is to effect removal of much of the inert gas incidental to condensation of the carbon dioxide and to remove the remainder of the inert gases by a stripping step.

Another object of the invention is to provide for recycling the inert gas after removal to recover any of the carbon dioxide that may be carried over therewith.

A further object of the invention is to provide a method for removing dissolved gases that is efficient from a power standpoint, since no external heat is required in removal of the inert gas, and, hence, refrigeration is conserved.

Another object is to subject the inert gas after removal from the zone of condensation to a lower temperature sufficient to condense carbon dioxide that is carried over from the first zone of condensation.

It is also an object of the invention to provide a method wherein the inert gas may be removed during and/or after liquefaction of a compressed stream of carbon dioxide.

In accomplishing these and other objects of the invention as hereinafter pointed out, we have provided new methods as diagrammatically disclosed in the attached drawing wherein:

Fig. 1 is a diagrammatic view of a portion of a carbon dioxide plant using carbon dioxide from a water scrubbing system of obtaining the carbon dioxide from a mixed stream of gases, and which illustrates our improved method of stripping out the dissolved gases using the sensible heat of liquefied carbon dioxide. This method is especially applicable to low purity $CO_2$ feed stock.

Fig. 2 is a similar view but showing the method of stripping out the inert gases by using sensible and/or latent heat of carbon dioxide gas which is to be liquefied. This scheme may be preferred for higher purity carbon dioxide feed streams.

Referring more in detail to the drawing:

1 designates a supply line of compressed gas taken from a carbon dioxide production plant, wherein the carbon dioxide is obtained by water scrubbing ammonia synthesis gas. Such method leaves a quantity of inert gases, particularly hydrogen and nitrogen, as contaminants in the $CO_2$ gas. Upon compression and condensation of the gas, the inert gas becomes dissolved to a certain extent in the liquid carbon dioxide. As above stated, the dissolved gas is undesirable, and in accordance with the present invention, the inert or contaminating gas is removed, as now to be described.

In carrying out the invention, the supply line 1 may lead directly from the last stage of compression (not shown) to conduct the compressed gas through precoolers such as heat exchangers 2 and 3, whereby the gas is precooled prior to admission thereof into a primary condenser 4 through a line 5 that connects the heat exchanger 3 with the primary condenser.

The primary condenser 4 may include an elongated vertically disposed vessel 6 having transverse partitions 7 and 8 spaced inwardly from the upper and lower heads 9 and 10 of the vessel to provide an inlet or primary separating compartment 11 at the lower end, an outlet compartment 12 at the upper end, and an intermediate refrigerating section 13. Extending through the section 13 is a plurality of tubes 14 connecting the compartments 11 and 12 and wherethrough the compressed gas flows from the inlet compartment 11 to the outlet compartment 12. The gas on flowing through the tubes is cooled to the condensing point of the carbon dioxide by refrigerant expanded about the tubes. The refrigerant is supplied through the line 15 and after expansion within the shell of the vessel is removed through a line 16. The inert or the gas which does not condense continues through the tubes and passes out through the upper compartment 12 and is removed through a pipe 17. The condensed carbon dioxide separates by gravity and flows downwardly through the tubes 14 and drips from the lower ends of the tubes onto a packing or other media 18 to promote contact of the incoming gas with an extended wetted area. The condensed carbon dioxide is thereby warmed to substantially the dew point temperature of the incoming gas stream being admitted through the line 5, and inert gases, having been dissolved at a lower temperature, are partially stripped from the liquid. Therefore, much of the separation which is desired is made in the inlet compartment 11, since with the conventional concurrent flow of condensed carbon dioxide and purge gas, the condensate is saturated by contact with the exit purge gas stream which contains a higher percentage of the inert gas. The condensate containing a relatively small amount of contaminating gas is discharged from the outlet of the compartment 11 through a line 19, at the feed gas dew point temperature of approximately 30° F. at 576 p. s. i. a., and is passed through the inert stripper reboiler 20 and whereby sensible heat in the liquid stream is utilized for reboiling of the condensate received in the storage tank 21. The condensate on leaving the reboiler 20 is discharged through a line 22 and flashed into the upper end of an inert stripper 23 upon reduction of pressure of the gas stream by means of a valve 24. The stream of condensate picks up cold from the reboiling of the condensate in the storage tank 21. For example, the temperature may then be 13° F. Upon throttling of the liquid and reduction of the pressure, the stream is further cooled so that it is flashed into the stripper 23 at a temperature of approximately —15° F. The cooled liquid on entering the upper end of the inert stripper 23 flows down or over packing or trays in contact with ascending vapors from the reboiling of the liquid collecting in the storage tank 21 to which the bottom of the inert stripper is directly connected. The vapor stream, upon moving upwardly through the packing or trays, strips out the remaining contaminating gas which is dissolved in the liquid carbon dioxide and the stripping vapors which do not condense in the stripper and the stripped out gas are cycled back to the third or last stage of compression through the line 25. In this way the dissolved gases are removed in an amount to give any desired purity of the liquid carbon dioxide contained in the storage tank, depending upon the temperature range maintained in the reboiler and the height of packing contained in the inert stripper.

Since no external heat is required for creating the stripping vapor, it is apparent from a refrigeration power standpoint the operation is equivalent to a simple flash, but a better removal of the dissolved gas is attained.

In the event that higher recoveries of carbon dioxide are required from the purge gas, the discharge line 17 from the primary condenser is connected with a purge gas condenser 26, which follows the construction of the primary condenser in that it includes a vertically elongated shell 27 having end compartments 28 and 29 which are interconnected by vertical tubes 30 extending through a refrigerating section 31 whereby the carbon dioxide purge gas mixture is cooled to a lower temperature by a lower temperature level of refrigeration, carried in the refrigerating section 31. The refrigerant, such as ammonia, is supplied by an inlet pipe 33 and is discharged through an outlet pipe 32. The line 17 is connected with the lower inlet compartment 28 so that the purge gas, at a temperature of substantially 15° F., passes upwardly through the inner sides of the tubes and wherein most of the remaining carbon dioxide is condensed to flow downwardly for collection in the compartment 28. The purge gas is discharged from the upper compartment 29 of the purge gas condenser through a pipe 34. It is obvious that the purge gas contains considerable cold, which is utilized in the heat exchanger 2 for precooling the influent stream of gas. The condensate from the lower compartment of the condenser is discharged at a temperature of approximately 15° F. and discharged through a valve 35 into the inert stripper along with the condensate from the primary condenser. When the purified carbon dioxide is utilized in making Dry Ice, it is discharged from the storage tank through a pipe line 36 leading to the snow chamber (not shown) of the Dry Ice making equipment (Dry Ice presses) to create the snow which is subsequently formed into blocks. Cold gas vaporized during production of the Dry Ice is used as a heat exchange medium in the heat exchanger 3 and is recycled through the pipe 38 to the suction side of, for example, the second stage of compression.

While the reboiler is shown and described as being contained in the storage tank, it may be a separate piece of equipment through which the collected liquid may be circulated and heated liquid returned to the tank or to the lower end of the inert stripper. Also, the inert stripper may be separate from the storage tank without departing from the spirit of the invention.

In some instances, particularly when the inert content of the supply gas stream is relatively small, the liquid carbon dioxide from the primary condenser is too cold to be a practical source of heat for the reboiler. In this case, the compressed gas is first passed, as shown in Fig. 2, through the reboiler 39 by way of a pipe line 40 and then returned through a pipe line 41 to preliminary heat exchange indicated at 42, from which the precooled gas stream is conducted through a pipe 43 to the primary condenser 44, which may be a vertical condenser as previously described, or a horizontal condenser as shown in Fig. 2. The liquid condensate from the condenser is then flashed through a pipe 45 into the upper portion of the inlet stripper 46 in the same manner as previously described. The vapors generated in the storage tank 47 responsive to the heating thereof by the reboiler 39 strip out the inert gases remaining in the condensate. The stripped out gases are discharged from the top of the inert stripper through a discharge line 48. The uncondensed gas remaining in the primary condenser 44 is discharged through a pipe line 49. If desired, these gases may be passed to a purge gas condenser in the same manner as previously described in connection with Fig. 1.

The vertical condenser shown in Fig. 1 has an advantage over a horizontal condenser, especially when the incoming carbon dioxide is of low purity, having a high inert gas content.

It will be noted that the primary condenser provides a condensing zone for the carbon dioxide and the cold carbon dioxide condensate is brought into contact with the influent stream of carbon dioxide gas so as to effect separation of the condensed carbon dioxide substantially at the point of the inlet to the primary condenser. Thus the liquid approaches equilibrium with the incoming stream, which is relatively lean in inert gas, rather than the inert gas enriched exit gas stream.

It is also obvious that the inert stripper provides a stripping zone wherein vapors from the reboiler strip out remaining dissolved inert gases so that the liquid carbon dioxide ultimately removed from the storage tank is substantially free of contaminating gases.

Also, it will be noted that the dissolved inert gases removed by the inert stripper are recycled by the compressor back to the condenser and are eventually removed from the system as purge gas.

The invention as illustrated in Fig. 1 when used in connection with a large Dry Ice plant having a low purity feed gas stream of about 80% carbon dioxide and 20% inert gas, mainly hydrogen and nitrogen, results in a very pure liquid in the storage tank, analyzing better than 99.9% carbon dioxide, although the purge gas contains 30% carbon dioxide and 70% inert gas.

What we claim and desire to secure by Letters Patent is:

1. A method of removing inert gas that is contained with carbon dioxide and which dissolves as a contaminant when the carbon dioxide is liquefied, as, for example, in the production of Dry Ice, said method comprising passing the carbon dioxide gas mixture into a condensing zone, cooling the carbon dioxide gas mixture in said condensing zone to effect condensation of the carbon dioxide and separation of much of the inert gas, removing purge gas from the condensing zone, removing the carbon dioxide condensate from the condensing zone, flashing the condensate into a stripping zone maintained at a lower temperature incidental to said flashing of the condensate, collecting liquid carbon dioxide reaching the lower portion of the stripping zone, passing the relatively warmer condensate removed from the condensing zone into heat exchange with the relatively colder liquid carbon dioxide for reboiling the liquid carbon dioxide to supply stripping vapors to the stripping zone and to precool the condensate prior to flashing, and removing purified liquid carbon dioxide from the place of reboiling.

2. A method of removing inert gas that is contained with carbon dioxide and which dissolves as a contaminant when the carbon dioxide is liquefied, as, for example, in the production of Dry Ice, said method comprising passing the carbon dioxide gas mixture into a condensing zone, cooling the carbon dioxide gas mixture in said condensing zone to effect condensation of the carbon dioxide and separation of much of the inert gas, passing the condensed carbon dioxide gas into contact with the incoming carbon dioxide gas mixture to partially strip the condensate of inert dissolved gas, removing purge gas from the condensing zone, removing the carbon dioxide condensate from the condensing zone, flashing the condensate into a stripping zone maintained at a lower temperature incidental to said flashing of the condensate, collecting liquid carbon dioxide reaching the lower portion of the stripping zone, passing the relatively warmer condensate removed from the condensing zone into heat exchange with the relatively colder liquid carbon dioxide for reboiling the liquid carbon dioxide to supply stripping vapors to the stripping zone and to precool the condensate prior to flashing, and removing purified liquid carbon dioxide from the zone of reboiling.

3. A method of removing inert gas that is contained with carbon dioxide and which dissolves as a contaminant when the carbon dioxide is liquefied, as, for example, in the production of Dry Ice, said method comprising passing the carbon dioxide gas mixture into a condensing zone, cooling the carbon dioxide gas mixture in said condensing zone to effect condensation of the carbon dioxide and separation of much of the inert gas, removing purge gas from the condensing zone, removing the carbon dioxide condensate from the condensing zone, flashing the condensate into a stripping zone maintained at a lower temperature incidental to said flashing of the condensate, collecting liquid carbon dioxide reaching the lower portion of the stripping zone, passing the relatively warmer condensate removed from the condensing zone into heat exchange with the relatively cooler liquid carbon dioxide for reboiling the liquid carbon dioxide to supply stripping vapors to the stripping zone and to precool the condensate prior to flashing, passing the purge gas to a second condensing zone, cooling the second condensing zone to a lower temperature to effect condensation of carbon dioxide from the purge gas, removing the condensate from the second condensing zone and passing the condensate along with the flashed condensate from the first condensing zone into the stripping zone, and removing purified liquid carbon dioxide from the zone of reboiling.

4. A method of removing inert gas that is contained with carbon dioxide and which dissolves as a contaminant when the carbon dioxide is liquefied, as, for example, in the production of Dry Ice, said method comprising passing the carbon dioxide gas mixture into a condensing zone, cooling the carbon dioxide gas mixture in said condensing zone to effect condensation of the carbon dioxide and separation of much of the inert gas, passing the condensed carbon dioxide gas into contact with the incoming carbon dioxide gas mixture to initially strip the condensate of inert dissolved gas, removing purge gas from the condensing zone, removing the carbon dioxide condensate from the condensing zone, flashing the condensate into a stripping zone maintained at a lower temperature incidental to said flashing of the condensate, collecting liquid carbon dioxide reaching the lower portion of the stripping zone, passing the relatively warmer condensate removed from the condensing zone to heat exchange with the relatively cooler liquid carbon dioxide for reboiling the liquid carbon dioxide to supply stripping vapors to the stripping zone and to precool the condensate prior to flashing, passing the purge gas to a second condensing zone, cooling the second condensing zone to a lower temperature to effect condensation of carbon dioxide from the purge gas, removing the condensate from the second condensing zone and passing the condensate along with the flashed condensate from the first condensing zone into the stripping zone, and removing purified liquid carbon dioxide from the zone of reboiling.

5. A method of removing inert gas that is contained with carbon dioxide and which dissolves as a contaminant when the carbon dioxide is liquefied, as, for example, in the production of Dry Ice, said method comprising passing influent carbon dioxide gas mixture into a condensing zone, cooling the carbon dioxide gas mixture in said condensing zone to effect condensation of the carbon dioxide and separation of much of the inert gas, removing purge gas from the condensing zone, removing the carbon dioxide condensate from the condensing zone, flashing the condensate into a stripping zone maintained at a lower temperature incidental to said flashing of the condensate, collecting liquid carbon dioxide reaching the lower portion of the stripping zone, passing the influent carbon dioxide prior to admission to the condensing zone into heat exchange with the relatively colder liquid carbon dioxide for reboiling the liquid carbon dioxide to supply stripping vapors to the stripping zone and to precool the influent prior to admission to the condensing zone, and removing purified liquid carbon dioxide from the place of reboiling.

6. A method of removing inert gas that is contained with carbon dioxide and which dissolves as a contaminant when the carbon dioxide is liquefied, as, for example, in the production of Dry Ice, said method comprising passing influent carbon dioxide gas mixture into a condensing zone, cooling the carbon dioxide gas mixture in said condensing zone to effect condensation of the carbon dioxide and separation of much of the inert gas, passing the condensed carbon dioxide gas into contact with the incoming carbon dioxide gas mixture to initially strip the condensate of inert dissolved gas, removing purge gas from the condensing zone, removing the carbon dioxide condensate from the condensing zone, flashing the condensate into a stripping zone maintained at a lower temperature incidental to said flashing of the condensate, collecting liquid carbon dioxide reaching the lower portion of the stripping zone, passing the influent carbon dioxide mixture prior to admission into the condensing zone into heat exchange with the relatively colder liquid carbon dioxide for reboiling the liquid carbon dioxide to supply stripping vapors to the stripping zone and to precool the influent prior to admission to the condensing zone, and removing purified liquid carbon dioxide from the zone of reboiling.

References Cited in the file of this patent

UNITED STATES PATENTS

| | | |
|---|---|---|
| 1,723,425 | Jaubert | Aug. 6, 1929 |
| 1,817,908 | Belt | Aug. 11, 1931 |
| 1,913,628 | Falkenberg | June 13, 1933 |
| 2,021,073 | Maiuri | Nov. 12, 1935 |
| 2,503,265 | Haynes | Apr. 11, 1950 |
| 2,582,148 | Nelly | Jan. 8, 1952 |
| 2,585,288 | Van Nuys | Feb. 12, 1952 |
| 2,632,316 | Eastman | Mar. 24, 1953 |
| 2,677,945 | Miller | May 11, 1954 |
| 2,696,088 | Twomey | Dec. 7, 1954 |